(12) United States Patent
Hollmann et al.

(10) Patent No.: US 11,755,288 B2
(45) Date of Patent: Sep. 12, 2023

(54) SECURE TRANSFORMATION FROM A RESIDUE NUMBER SYSTEM TO A RADIX REPRESENTATION

(71) Applicant: KONINKLIJKE PHILIPS N.V., Eindhoven (NL)

(72) Inventors: Hendrik Dirk Lodewijk Hollmann, Valkenswaard (NL); Ronald Rietman, Eindhoven (NL); Ludovicus Marinus Gerardus Maria Tolhuizen, Waalre (NL); Sebastiaan Jacobus Antonius De Hoogh, Oosterhout (NL)

(73) Assignee: Koninklijke Philips N.V., Eindhoven (NL)

( * ) Notice: Subject to any disclaimer, the term of this patent is extended or adjusted under 35 U.S.C. 154(b) by 451 days.

(21) Appl. No.: 16/347,715

(22) PCT Filed: Oct. 30, 2017

(86) PCT No.: PCT/EP2017/077835
§ 371 (c)(1),
(2) Date: May 6, 2019

(87) PCT Pub. No.: WO2018/086951
PCT Pub. Date: May 17, 2018

(65) Prior Publication Data
US 2019/0272153 A1    Sep. 5, 2019

(30) Foreign Application Priority Data

Nov. 8, 2016 (EP) .................................. 16197707

(51) Int. Cl.
*G06F 7/72* (2006.01)
*H04L 9/00* (2022.01)

(52) U.S. Cl.
CPC .............. *G06F 7/729* (2013.01); *G06F 7/728* (2013.01); *H04L 9/002* (2013.01); *H04L 2209/16* (2013.01)

(58) Field of Classification Search
CPC . G06F 7/72; G06F 7/728; G06F 7/729; H04L 9/00–005; H04L 9/06–0668;
(Continued)

(56) References Cited

U.S. PATENT DOCUMENTS 4,752,904 A * 6/1988 Paul ........................ G06F 11/16
341/83
5,077,793 A    12/1991 Falk et al.
(Continued)

FOREIGN PATENT DOCUMENTS

WO    2009100299 A1    8/2009
WO    2014095772 A1    6/2014
WO    2014096117 A1    6/2014

OTHER PUBLICATIONS

H. Hollmann et al., A Multi-layer Recursive Residue Number System, 2018 IEEE International Symposium on Information Theory (ISIT), 2018 (Year: 2018).*
(Continued)

*Primary Examiner* — Emily E Larocque

(57) ABSTRACT

An electronic calculating device (100) arranged to convert an input number (y) represented (($y_1, y_2, \ldots, y_k$)) m a residue number system (RNS) to an output number represented in a radix representation (($e_0, e_1, \ldots e_{s-1}$)), the calculating device comprising an input interface (110) arranged to receive the input number (y) represented in the residue number system, and a processor circuit (120) configured to iteratively update an intermediate number (ŷ) represented in the residue number system, wherein iterations produce the digits ($e_0, e_1, \ldots e_{s-1}$) in the radix representation with respect to the bases ($b_0, b_1, \ldots, b_{s-1}$), at least one
(Continued)

iteration comprises computing the intermediate number modulo a base ($b_t$) of the radix representation to obtain a digit ($e_t=(\hat{y})_{b_t}$) of the radix representation, updating the intermediate number ($\hat{y} \leftarrow (\hat{y}-e_t+F)/b_t$) by subtracting the digit from the intermediate number, adding an obfuscating number (F; $F_t$), and dividing by the base ($b_t$).

20 Claims, 3 Drawing Sheets

(58) Field of Classification Search
CPC . H04L 9/30–3093; H04L 9/3247–3257; H04L 2209/16; H04K 1/00; H04K 1/04; H04K 1/06; H04K 1/10
See application file for complete search history.

(56) References Cited

U.S. PATENT DOCUMENTS

| | | | |
|---|---|---|---|
| 2011/0019817 A1* | 1/2011 | Michaels | H04K 1/025 380/38 |
| 2012/0140920 A1 | 6/2012 | Ghouti et al. | |
| 2016/0239267 A1 | 8/2016 | Bos et al. | |

OTHER PUBLICATIONS

K.A. Gbolagade, An O(n) Residue Number System to Mixed Radix Conversion Technique, IEEE, 2009 (Year: 2009).*
H.M. Yassine et al., Improved mixed-radix conversion for residue number system architectures, IEE Proceedings-G, vol. 138, No. 1, 1991 (Year: 1991).*
D. Patterson et al., Computer Organization and Design, the Hardware/Software Interface, Elsevier, 3rd ed., 2005 (Year: 2005).*
Bajard et al: "RNS Bases and Conversions";SPIE-International Society for Optical Engineering, vol. 5559, Oct. 26, 2004.
Koren: "Computer Arithmetic Algorithms" 2nd Edition. Chapter 11,"The Residue Number System"; Jan. 2002, pp. 259-275.
Omondi et al: "Residue Number Systems, Theory and Implementation"; Advances in Computer Science and Engineering: Texts—vol. 2, Chapter 7, "Reverse Conversion"; Jan. 2007, pp. 213-253.
Barsi et al: "Fast Base Extension and Precise Scaling in RNS for Look-Up Table Implementations"; IEEE Transactions on Signal Processin, vol. 43, No. 10, Oct. 1995, pp. 2427-2430.
Burgess: Efficient RNS-to-Binary Conversion Using High-Radix SRT Division; IEEE Proc-Comput. Digit. Tech, vol. 148, No. 1, Jan. 2001, pp. 49-52.
Chow et al: "A White-Box Des Implementation for DRM Applications"; DRM 2002, LNCS 2696, pp. 1-15, 2003.
Dehm: "Design of an Efficient Public-Key Cryptographic Library for Risc-Based Smart Cards"; Phd Thesis, University Catholique De Louvain, 1998, 198 Page Document.
Garner: "The Residue Number System"; IRE Transactions on Electronic Computers, Jun. 1959, pp. 140-147.
Hollmann: "Converting Modulo Operations"; Dec. 16, 2015, pp. 1-19.
Kong et al:"Fast Scaling in the Residue Number System"; IEEE Transactions on Very Large Scale Integration (VSLI) Systems, vol. 17, No. 3, Mar. 2009, pp. 443-447.
Omondi: "Fast Residue-to-Binary-Conversion Using Base Extension and the Chinese Remainder Theorem"; Journal of Circuits, Systems, and Computers, vol. 16, No. 3, 2007, pp. 379-388.
Shenoy et al: "Residue to Binary Conversion for RNS Aritmetic Using Only Modular Look-Up Tables"; IEEE Transactions on Circuits and Systems, vol. 35, No. 9, Sep. 1988, pp. 1158-1159.
Shenoy et al: "Fast Base Extension Using a Redundant Modulus in RNS"; IEEE Transaction on Computers, vol. 38, No. 2, Feb. 1989, pp. 292-297.
PCT/EP2017/077835—ISR and Written Opinion, dated Jan. 23, 2018.

* cited by examiner

SECURE TRANSFORMATION FROM A RESIDUE NUMBER SYSTEM TO A RADIX REPRESENTATION

CROSS-REFERENCE TO PRIOR APPLICATIONS

This application is the U.S. National Phase application under 35 U.S.C. § 371 of International Application No. PCT/EP2017/077835, filed on Oct. 30, 2017, which claims the benefit of European Patent Application No.16197707.9, filed on Nov. 8, 2016. These applications are hereby incorporated by reference herein.

FIELD OF THE INVENTION

The invention relates to an electronic calculating device, an electronic calculating method, and a computer readable medium.

BACKGROUND

In secure computing, especially in white-box cryptography, numbers are often encoded in the Residue Number System (RNS) representation. In a Residue Number System (RNS), a modulus m is a product $m=m_1 \ldots m_k$ of relatively prime smaller moduli $m_i$, and integers $y \in [0, m)$ are uniquely represented by their list of residues $(y_1, \ldots, y_k)$, where $y_i = |y|_{m_i} \in [0, m_i)$ satisfies $y \equiv y_i \mod m_i$ for all i.

The RNS representation is advantageous, since arithmetic on RNS represented numbers can often be done separately on the RNS digits. For example, to add or multiply numbers in RNS representation it suffices to add or multiply the corresponding components modulo the corresponding moduli. In this way, the problem of carry has to a large extent disappeared. Especially in white-box cryptography the RNS representation is advantageous. Conversion of integers in RNS representation to conventional Radix representation is often required for compatibility with non-RNS computation elements. However, conventional RNS-to-Radix conversion processes use an iterative process wherein intermediate numbers that identify the digits of the Radix used in the process get smaller and smaller, resulting in cryptologic leakage. The introduction of obfuscating numbers in the RNS-to-Radix conversion assures that the intermediate numbers do not get smaller and smaller, thereby substantially reducing the cryptographic leakage.

Nevertheless, it is sometimes required to represent a number in radix representation. The most basic type of radix representation is also called the b-ary representation, for some integer b. Given the positive integer b, the b-ary representation of an integer $y \in [0, b^s)$ writes y in the form $y = d_0 + d_1 b + \ldots + d_{s-1} b^{s-1}$ with b-ary (integer) digits $d_i \in [0, b)$ for all i. For example, an integer may represent a result, e.g., an output of a computation. The result may have to be reported, e.g., to a user, who is not used to seeing numbers in RNS representation. The result may have to be further processed by some algorithm that does not expect an RNS number. For example, the result is to be further rendered, or further processed, possibly in a non-secure routine. For example, a digit-based algorithm, such as the digit-based Montgomery multiplication, needs a Radix representation as input.

The inventors found that known algorithms for converting RNS representation to a Radix representation do not convert well to secure computing, in particular to white-box computing. In a white-box computation, also during a RNS to Radix conversion, the software should not leak information on the encoding used to protect the software. However, as will be further detailed below this is not the case.

SUMMARY OF THE INVENTION

The inventors found that during conversion of RNS represented numbers to radix representation some of the intermediate values tend to become smaller and smaller. This has therefore the opportunity to leak information regarding the way small numbers are encoded in the system. It is considered undesired to give an attacker the opportunity to obtain information on the encoding. Such information may be leveraged in attacks on other parts of the system.

An electronic calculating device is provided to convert an input number represented in a residue number system (RNS) to an output number represented in a radix representation. Obfuscation added during the updating of the intermediate number counters the decreasing of the intermediate number that occurs during conventional RNS-to-Radix conversion. The attacker thus cannot obtain information on small numbers by observing the intermediate values.

Possible applications of the conversion are to report the result of an earlier computation done in RNS, e.g., to the user, or in an electronic report of some kind, or to render the result. Conversion may also be needed as part of digit-based algorithms, since the algorithm can work entirely with pseudo-residues. RNS systems are widely used, for example in digital signal processing and cryptography. The method is well-suited to be used in white-box applications since it can work with small data elements only, so that all arithmetic can be done by table lookup.

A method according to the invention may be implemented on a computer as a computer implemented method, or in dedicated hardware, or in a combination of both. Executable code for a method according to the invention may be stored on a computer program product. Examples of computer program products include memory devices, optical storage devices, integrated circuits, servers, online software, etc. Preferably, the computer program product comprises non-transitory program code stored on a computer readable medium for performing a method according to the invention when said program product is executed on a computer.

In a preferred embodiment, the computer program comprises computer program code adapted to perform all the steps of a method according to the invention when the computer program is run on a computer. Preferably, the computer program is embodied on a computer readable medium.

Another aspect of the invention provides a method of making the computer program available for downloading. This aspect is used when the computer program is uploaded into, e.g., Apple's App Store, Google's Play Store, or Microsoft's Windows Store, and when the computer program is available for downloading from such a store.

BRIEF DESCRIPTION OF THE DRAWINGS

Further details, aspects, and embodiments of the invention will be described, by way of example only, with reference to the drawings. Elements in the figures are illustrated for simplicity and clarity and have not necessarily been drawn to scale. In the Figures, elements which correspond to elements already described may have the same reference numerals. In the drawings, FIG. 1 schematically shows an example of an embodiment of a calculating device and a computing device, FIG. 2 schematically shows an example of an embodiment of a calculating device, FIG. 3 schematically shows an example of an embodiment of a calculating method, FIG. 4a schematically shows a computer readable medium having a writable part comprising a computer program according to an embodiment, FIG. 4b schematically shows a representation of a processor system according to an embodiment.

DETAILED DESCRIPTION OF PREFERRED EMBODIMENTS

Figure 1:
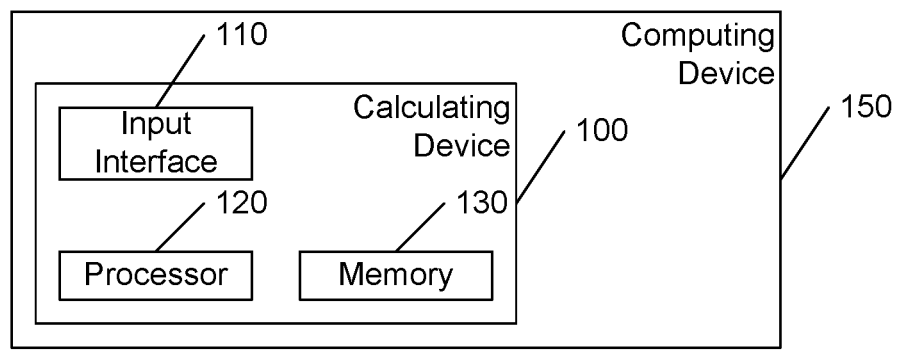

While this invention is susceptible of embodiment in many different forms, there are shown in the drawings and will herein be described in detail one or more specific embodiments, with the understanding that the present disclosure is to be considered as exemplary of the principles of the invention and not intended to limit the invention to the specific embodiments shown and described.
In the following, for the sake of understanding, elements of embodiments are described in operation. However, it will be apparent that the respective elements are arranged to perform the functions being described as performed by them.

Further, the invention is not limited to the embodiments, and the invention lies in each and every novel feature or combination of features described herein or recited in mutually different dependent claims.

Integers can be represented in a number of different ways. This application is concerned with radix representations and residue number system representations (RNS).

Radix representations come in a number of flavors. The most basic type of radix representation is also called the b-ary representation, for some integer b. Given the positive integer b, the b-ary representation of an integer $y \in [0, b^s)$ writes y in the form $y = d_0 + d_1 b + \ldots + d_{s-1} b^{s-1}$ with b-ary (integer) digits $d_i \in [0, b)$ for all i. More general, given numbers $b_0, \ldots, b_{s-1}$, a Mixed Radix (MR) Representation writes an integer y in the form $y = d_0 + d_1 b_0 + \ldots + d_{s-1} b_0 \ldots b_{s-2} + q b_0 \ldots b_{s-1}$ with integer MR-digits $d_i \in [0, b_i)$ for all i, for some integer q. In some applications, a correction term q may be allowed. If y is small enough a correction term is not needed.

The inventors found that even the mixed radix representation may be further generalized. In the generalized mixed radix representation (GMR), a number is represented as $y = e_0 + e_1 b_0 + \ldots + e_{s-1} b_0 \ldots b_{s-2} = e_{s-1} b_0 \ldots b_{s-1} = e - \varepsilon_{s-1} b_0 \ldots b_{s-1}$. A difference with the mixed radix representation is that the digits $e_i$ are not required to be chosen from the interval $[0, b_i)$, but are allowed to be pseudo-residues modulo $b_i$. An integer p is a pseudo-residue of the integer x modulo m if $p \equiv x \mod m$ and $0 \leq p < \varphi m$, for some predetermined integer $\varphi$. The integer $\varphi$ is called the expansion bound, and limits the growth of the pseudo-residues. If $\varphi = 1$, the pseudo-residue is a regular residue.

It is possible, to further loosen the restriction on pseudo residues, e.g., by merely requiring that $-\varphi m < p < \varphi m$. For convenience of presentation we will not make this loosened assumption, but it is understood that the discussion below could easily be adapted to take the less restrictive bound into account.

If $\varphi > 1$ there is more than once choice for a digit in generalized MR representation. As a result, the representation in generalized MR representation is typically not unique. The inventors found that in many applications in which an MR representation is employed as an input, often a generalized MR representation can also be used. This is advantageous as computing a generalized MR representation may be done more efficiently and with better obfuscation options. For example, if the MR representation is used as input for a digit-based Montgomery multiplication algorithm, then the generalized MR representation can be used. By setting $\varphi = 1$ in embodiments below a regular MR representation may be obtained though. By setting $b_i = b$ for all i, and $\varphi = 1$ in embodiments below, a b-arry representation is obtained.

In a Residue Number System (RNS), a modulus m is a product $m = m_1 \ldots m_k$ of relatively prime smaller moduli $m_i$, and integers $y \in [0, m)$ are uniquely represented by their list of residues $(y_1, \ldots, y_k)$, where $y_i = |y|_{m_i} \in [0, m_i)$ satisfies $y \equiv y_i \mod m_i$ for all i. Such a representation by residues is called the RNS representation. The representation still uniquely determines y when the $y_i = \langle y \rangle_{m_i}$ are only assumed to be pseudo-residues, that is, when only $y_i \equiv y \mod m_i$ holds, but not necessarily with $0 \leq y_i < m_i$.

Conversion is the operation of converting a number in RNS representation to a radix type representation. In secured applications, typically both the b-ary digits (or MR-digits) of a large integer and its pseudo-residues are given in encoded form, e.g., with multiple representations possible by encoding with a state, and conversion should be done without leaking any information about these digits. Conventional algorithms typically use a form of modular arithmetic modulo the $b_i$ to determine the MR-digits. See, for more information on white-box, the paper by Chow et al "A White-Box DES Implementation for DRM Applications". See, for more information on white-box, and in particular on encoding using states the application "Computing device configured with a table network", published under number WO2014096117. See also, "Computing device comprising a table network", published under number WO2014095772, for information on how to represent computer programs in white box form.

In embodiments, a conversion is computed from, e.g., a pseudo-RNS representation, employing pseudo-residues only, in a way suitable for secure implementations. Embodiments use modular arithmetic modulo the $b_i$, but note that some embodiments do not require exact residues, but instead pseudo-residues. Embodiments prevent the leaking of information inherent in conventional conversion. Moreover, since the algorithm can work entirely with pseudo-residues, the representation obtained from our conversion algorithm can also be used in digit-based algorithms, when implemented in RNS.

In an embodiment, the system is implemented using white-box cryptography. Data is represented in encoded form, possibly together with a state. States are redundant variables so that the encoding is not unique. For example, a (possibly very large) integer y may be represented by its list of residues $(y_1, \ldots, y_k)$, in encoded form. That is, every residue $y_i$ is given in the form $\bar{y}_i = E(y_i, s_i)$, were $s_i$ is a state-variable and E is some encoding function (typically a permutation on the data-state space). Operations on encoded variables are typically performed using look-up tables. Larger operations are broken up into smaller operations if needed. As a result, the computation may take the form of a table network, comprising multiple look up tables. Some tables take as input part of the input to the algorithm, e.g., the number be conversed. Some tables take as input the output of one or more other tables. Some tables produce part of the output. For example, the required arithmetic modulo the $m_i$ is typically implemented by some form of table look-up, at least if the $m_i$ are relatively small.

During conversion in white-box, the MR digits of an integer must be obtained in encoded form from the encoded residues. Conventional RNS to MR conversions algorithms have various drawbacks, especially in the context of white-box implementations.

For example, conversion methods based on the Chinese Remainder Theorem (CRT) involve direct computations with very large integers, and hence will involve some form of add-with-carry algorithms. Such methods are less suitable in white-box applications since the carries even in encoded form will probably leak information. White-box prefers methods that do computations with relatively small (encoded) data; large integers will be represented by a list of (encoded) digits. For example, the encoded data may be about byte size.

In a Residue Number System (RNS), an integer y is represented by its list of residues $(y_1 = |y|_{m_1}, \ldots, y_k = |y|_{m_k})$ modulo a number of moduli $m_1, \ldots, m_k$. Conventionally, the moduli $m_1, \ldots, m_k$ are chosen pairwise prime. In that case, writing $m = m_1 \ldots m_k$, the Chinese Remainder Theorem (CRT) guarantees that every integer y with $0 \leq y < m$ can be recovered uniquely from its list of residues $(y_1, \ldots, y_k)$ modulo the moduli $m_1, \ldots, m_k$. The inventors have realized however, that this condition, although convenient, is not strictly necessary. An RNS would also work if the moduli are not all chosen to be relatively prime, in this case, one may take m as the least common multiple of the moduli $m_1, \ldots, m_k$; still an integer y with $0 \leq y < m$ can be recovered uniquely from its residues modulo the moduli.

In the discussion below, we will further assume that the moduli are relatively prime; this will make the presentation easier to follow. However, the embodiments below may be adapted to the case when not all moduli are relatively, prime, e.g., if that are at least two moduli $m_i$ and $m_j$ that have a common divisor larger than 1.

We continue with $m = m_1 \ldots m_k$, and the assumption that the moduli are all pairwise prime. Using the Chinese Remainder Theorem (CRT) an integer y with $0 \leq y < m$ can be recovered uniquely from its list of residues $(y_1, \ldots, y_k)$ based on the fact that $$y = \sum_{i=1}^{k} y_i |(m/m_i)^{-1}|_{m_i} (m/m_i) - qm \quad (1)$$

for some integer q. In applications, it is often required to be able to recover y from its list of residues $(y_1, \ldots, y_k)$ in a fast way. Methods based on MR conversion attempt to write a given integer y with $0 \leq y < m$ into Mixed-Radix form as $$y = d_0 + d_1 b_0 + \ldots + d_{s-1} b_0 \ldots b_{s-2} + qb_0 \ldots b_{s-1} = d_0 B_0 + d_1 B_1 + \ldots + d_{s-1} B_{s-1} + qB \quad (2)$$

for integer-valued b-ary MR-digits $d_0, d_{s-1}$ with $0 \leq d_i < b_i$ and integer q; here $B_i = b_0 \ldots b_{i-1}$ for all i (and $B_0 = 1$), and $B = B_s = b_0 \ldots b_{s-1}$. Such representations will be referred to as Mixed-Radix (MR) representations. A typical example is the case where $b_0 = b_1 = \ldots = b_{s-1} = b$, giving a b-ary representation.

Consider the following reference method for conversion in a RNS, which does not comprise the feature of adding an obfuscating number. Given an RNS based on moduli $m_1, \ldots, m_k$ with dynamical range $m = m_1 \ldots m_k$, for converting an integer $y \in [0, m)$ from RNS to radix, proceed as follows.

1. Set $y^{(0)} = y$
2. for $t = 0, \ldots, s-1$, compute
   (a) $d_t = |y^{(t)}|_{b_t}$;
   (b) $y^{(t+1)} = (y^{(t)} - d_t)/b_t$ (exact division).

Then $y^{(t)} = d_t + d_{t+1} b_t + \ldots + d_{s-1} b_t \ldots b_{s-2}$ for all t and, in particular, $y = y^{(0)} = d_0 + d_1 b_0 + \ldots + d_{s-1} b_0 \ldots b_{s-2}$, with digits $d_t \in [0, b_t)$. We can compute an RNS representation $(y_{t+1,1}, \ldots, y_{t+1,k})$ for $y^{(t+1)}$ from the RNS representation $(y_{t,1}, \ldots, y_{t,k})$ of $y^{(t)}$ by using that $$y_{t+1,i} \equiv (y_{t,i} - d_t) b_t^{-1} \mod m_i$$

provided that $b_t$ and $m_i$ are relatively prime; if not, then we can use, e.g., base extension, e.g., using a method employing mixed-radix conversion (See, Garner, The Residue Number System, *Ire Transactions On Electronic Computers*, June 1959, pp 140-147) or a method using a redundant-modulus (See, A. P. Shenoy and R Kumaresan. Fast base extension using a redundant modulus in RNS. *Computers, IEEE Transactions on*, 38(2):292-297, 1989) to determine the new residue. Also, to determine $d_t$, if $b_t$ is equal to some modulus $m_i$, then $d_t = y_{t,i}$; if not, then $d_t$ may again be determined by base extension.

A disadvantage of the reference algorithm described above is that the numbers $y^{(t)} = d_t + d_{t+1} b_t + \ldots + d_{s-1} b_t \ldots b_{s-2}$ get smaller and smaller, which is undesirable in white-box applications. Because of the decreasing entropy in the $y^{(t)}$, this may leak information. For example, it is known that the last $y^{(s-1)} = d_t$ is small, but is encoded in the full (encoded) RNS system. As a consequence, information about the encoding of "small" numbers is leaked. An attacker can thus build a list of encoded small numbers.

The leaked encoding of small numbers can be leverage by an attacker in different ways. For example, by analyzing the output of individual modular addition tables when given as input these small numbers, an attacker may be able to obtain the value of small numbers from their encoded versions. By further analysis, the attacker may then even undo the encodings for all numbers and thus obtain the values of variables if the program is run. Moreover, these same small numbers may be repeated elsewhere in the white-box implementation. The attacker can now recognize the occurrence of small numbers everywhere in the white-box implementation. This information may be leveraged in attacking other parts of the implementation. Although, this could be mitigated by using different encodings in different parts of the white-box implementation, this would require many more tables for doing computations, i.e., one for each encoding, and thus increase the hardware footprint of the implementation. To avoid separate encoding for each part of the program, it is thus desirable to limit leakage in all parts as much as possible.

A further disadvantage of the above reference algorithm is that it cannot work with pseudo-residues since it assumes that in the t-th iteration, the digit $d_t$ can be determined exactly.

As further detailed below, in contrast, in an embodiment, with a suitable choice of the $f_t$ it can be ensured that the $\hat{y}^{(t)}$ are spread over their full range, and thus do not leak information. Also, the algorithm can work with pseudo-residues instead of residues, except that in the base extensions, the arithmetic modulo the redundant modulus $m_0 \geq \varphi (k-1)$ has to be exact. Note, that the redundant modulus may be the product of relatively prime small moduli so that the redundant modulus does not place a constraint on the possible size k of the RNS. In some embodiments, obfuscating, e.g., random, integers, e.g. $f_t$ are used to increase the entropy of the intermediate results, and to allow the possibility by varying these obfuscating integers to have a different version of the algorithm with every run, even with different encodings in the white-box case. In some embodiments, the algorithm operates with pseudo-residues instead of residues, with the possible exception of the redundant modulus arithmetic, which in an embodiment is exact. By introducing requirements on the redundant modulus, embodiments may use base extension using pseudo-residues instead of simply residues.

Figure 2:
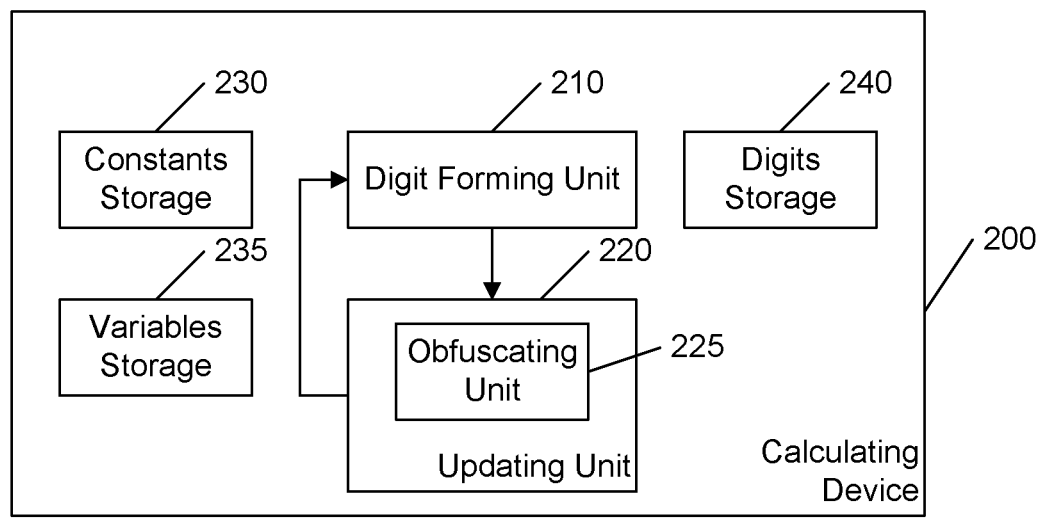

Embodiments of the calculating device according to the inventions are illustrated with respect to FIGS. 1 and 2. Further details of the operation of embodiments according to either one of FIGS. 1 and 2 are detailed further below.

FIG. 1 schematically shows an example of an embodiment of a calculating device 100 and a computing device 150.

The calculating device 100 shown in FIG. 1 is arranged to convert an input number y represented $(y_1, y_2, \ldots, y_k)$ in a residue number system (RNS) to an output number represented in a radix representation $(e_0, e_1, \ldots, e_{s-1})$. Calculating device 100 is shown in FIG. 1 as comprised in a computing device 150. Computing device 150 may be a secure computing device, e.g., a white box implementation of some algorithm. In an embodiment, computing device 150 operates on encoded data, e.g., as described above, e.g., in a white-box implementation. For example, computing device 150 may call on calculating device 100 to convert a number to a radix presentation, so that it can be rendered, reported, outputted, etc. For example, computing device 150 may call on calculating device 100 in order to execute an algorithm that requires radix representation as input.

Calculating device 100 comprises an input interface 110 arranged to receive the input number (y) represented in the residue number system. The input interface may be selected from various alternatives. For example, input interface 110 may be a network interface to a local or wide area network, e.g., the Internet, a storage interface to an internal or external data storage, a keyboard, etc. The interface may be an application program interface (API). Computing device 150 may share the processor circuit and memory. Computing device 150 may use calculating device 100 by starting to execute the appropriate code, e.g., retrieving and applying the tables needed to the conversion algorithm.

For example, input interface 110 may obtain the input number y as a sequence of encoded integers. The encoded integers represent the residues modulo the moduli $m_i$ of the RNS. For example, input interface 110 may obtain the encoded integers in the form of pointers to said encoded integers, etc.

Calculating device 100 comprises a processor circuit 120. The processor circuit may be a single core, or may have multiple cores. The processor circuit may be distributed over two, possibly physically separated, processor circuits, e.g., sub-circuits. Calculating device 100 comprises a memory 130. The memory may comprise a volatile and a non-volatile part. The latter is optional, for example, in an embodiment constant parts of the data, e.g., processor instructions, tables or data constants, may be downloaded before the conversion is started. The volatile part of memory may store any one of input data, intermediate data, and output data, etc., on which processor circuit 120 acts. Processor circuit 120 may be a general-purpose computer processor arranged to execute programming instructions stored in a memory. Processor circuit 120 may also be, possibly in part, a specialized circuit arranged to execute a method according to the invention. For example, processor circuit 120 may comprise hardware arranged to retrieve and/or apply a look-up table.

For example, memory 130 may store look-up tables that are configured to act upon encoded data. For example, memory 130 may store variables, e.g., intermediate data, on which the tables act. For example, processor circuit 120 may retrieve a table form memory 130 and apply it to one or more data items that are also retrieved from memory 130. The result may be stored in memory 130, and may be later used to form the input for yet further table operations. Part of memory 130 may be a read-only memory, e.g., to store programming instructions, or tables.

Memory 130 in particular stores an intermediate number $(\hat{y})$ represented in the residue number system. The intermediate number may initially be the number y received at the input of calculating device 100. The intermediate number may also be obtained from the input number after optional additional processing, e.g., additional obfuscation, a further encoding, an encoding translation, etc. In the latter step, an encoding used in computing device 150 is changed to an encoding used in calculating device 100.

Processor circuit 120 is configured to iteratively update the intermediate number $\hat{y}$. The representation of the intermediate number remains in the residue number system, preferably in encoded form. Each iteration produces a digit of the digits $e_0, e_1, \ldots, e_{s-1}$ in the radix representation with respect to the bases $b_0, b_1, \ldots, b_{s-1}$ of the radix representation. An iteration comprises computing the intermediate number modulo a base $(b_t)$ of the radix representation to obtain a digit $(e_t = \langle \hat{y} \rangle_{b_t})$ of the radix representation, updating the intermediate number $(\hat{y} \leftarrow (\hat{y} - e_t + F)/b_t)$ by subtracting the digit from the intermediate number, adding an obfuscating number, and dividing by the base $(b_t)$.

More details of the computing and updating step are provided below with respect to FIG. 2 and in particular in the following discussion. Furthermore, many options and alternatives are discussed there which are applicable in calculating device 100.

FIG. 2 schematically shows an example of an embodiment of a calculating device 200. The calculating device 200 shown in FIG. 2 has a number of functional units to execute part various parts of an embodiment. The embodiment shown in FIG. 2 may be implemented in the form of an embodiment according to FIG. 1. For example, the storages used in FIG. 2 may be implemented as part of memory 130. The functional units may be implemented as software units stored in memory 130 and executed by processor circuit 120. The functional units may also be implemented as circuits, or as combinations of software and hardware.

Calculating device 200 comprises a variable storage 235. Calculating device 200 stores intermediate data on which calculating device 200 acts. In particular, variable storage 235 stores the intermediate number represented in RNS. The input number y may also be stored in variable storage. For example, the input interface may be implemented by storing the input number in variable storage 235, possibly in combination with initiating the conversion process.

Calculating device 200 also comprises a constant storage 230. Constant storage 230 may be implemented as a read-only memory. For a white-box implementation constant storage 230 comprises look-up tables for operating on encoded data. Constant storage 230 may also, or instead, comprise programming instructions for operating on (encoded) data, etc. Constant storage 230 may also comprise the bases $b_0, b_1, \ldots, b_{s-1}$ of the radix representation and/or the moduli $m_i$ of the RNS system. However, in an embodiment these numbers are implicit in the tables used, and need not be explicitly listed, not even in encoded form.

Calculating device 200 comprises a digit forming unit 210. Digit forming unit 210 is configured to compute the intermediate number modulo a base $(b_t)$ of the radix representation to obtain a digit $(e_t = \langle \hat{y} \rangle_{b_t})$ of the radix representation. Calculating device 200 comprises an updating unit 220. The updating unit is configured to updating the intermediate number $(\hat{y} \leftarrow (\hat{y} - e_t + F)/b_t)$ by subtracting the digit from the intermediate number and dividing by the base $(b_t)$. The updating unit comprises an obfuscating unit 225 configured to add an obfuscating number $(F; F_t)$. Note that there are multiple ways in which the formula $(\hat{y} - e_t + F)/b_t)$ could be implemented, for example, $(\hat{y} - e_t + F)/b_t = (\hat{y} - e_t)/b_t + F/b_t$. The latter $F/b_t$ may be precomputed so that the division need not be performed online. Note that adding the obfuscating number may be integrated in a table that also computes other tasks, e.g., subtracting $e_t$.

Calculating device 200 is configured to iterate the digit forming unit 210. The iterations produce the digits $(e_0, e_1, \ldots, e_{s-1})$ in the radix representation with respect to the bases $(b_0, b_1, \ldots, b_{s-1})$ of the radix representation. The digits produced by digit forming unit 210 may be stored in a digit storage 240. Digit storage 240 may be combined with variable storage 235. Digital storage 240 may thus contain the output of calculating device 200. The content of digit storage 240 may be used by further algorithms, e.g., for rendering, for reporting, etc.

In what follows, we will need the notion of a pseudo-residue. A pseudo-residue of an integer x modulo a modulus m is an integer p for which $p \equiv x \mod m$. We will write $p = \langle x \rangle_m$ to to denote an (unspecified) pseudo-residue. We speak of pseudo-residues with (integer) expansion factor $\varphi$ if the pseudo-residues $p = \langle x \rangle_m$ satisfy $0 \le p < \varphi m$. A pseudo-residue allows more freedom than an exact residue for which it is required that it lies exactly in the interval $[0, m)$, that it $0 \le p < m$. On the other hand, ensuring that all variables are pseudo-residues avoids unrestricted growth of the variables. The additional freedom of using pseudo-residues allows more efficient algorithms, e.g., for the modular arithmetic, even when taking into account that the residue has to conform to the expansion factor. For exact residues, we write $p = |x|_m$, in this case $0 \le p < m$.

We now present a new method suitable for white-box for conversion, such as conversion from a Residue Number System (RNS) to a Radix type representation. The algorithm is suitable to receive the input in pseudo-residues, and to employ mostly pseudo-residues during computations.

Let $m = m_1 \ldots m_k$ with the $m_i$ relatively prime positive integers. In the RNS based on the moduli $m_1, \ldots, m_k$, an integer y in the range $[0, m)$, that is, with $0 \le y < m$, is represented by its list of residues $(y_1, \ldots, y_k)$, where $y_i = \langle y \rangle_{m_i}$ may be pseudo-residues or exact residues. By the Chinese Remainder Theorem (CRT), every integer in the range $[0, m)$ can be recovered uniquely from its list of pseudo-residues. We refer to the representation of $y \in [0, m)$ by its list of (pseudo) residues $(y_1, \ldots, y_k)$ as a Residue Number System (RNS) representation of y. We will use the term pseudo-RNS representation to emphasize that in the RNS type representation pseudo residues for the components $y_i$ are allowed. As exact residues are a special case of pseudo residues, so is exact RNS a special case of a pseudo-RNS. The algorithms may be adapted to use only exact residues by setting the expansion factor $\varphi$ to 1.

Let $b_0, \ldots, b_{s-1}$ be positive integers. The Mixed-Radix (MR) presentation of an integer y with respect to $(b_0, \ldots, b_{s-1})$ writes y as $$y = d_0 + d_1 b_0 + d_2 b_0 b_1 + \ldots + d_{s-1} b_0 \ldots b_{s-2} + q b_0 \ldots b_{s-1}, \quad (4)$$

with integer digits $d_0, \ldots d_{s-1}$ for which $d_i \in [0, b_i)$ and with an integer q. In applications, the value of q may be restricted, possibly even to $q = 0$, if the size of y is known because of the application which produced y. For convenience, we will assume $q = 0$.

In various applications, we want to compute the digits $d_0, \ldots, d_{s-1}$ of the MR representation of $y \in [0, m)$ from its (pseudo) residues $(y_1, \ldots, y_k)$. Note that, for example, in the case where $b_0 = \ldots = b_{s-1} = b$, the $d_i$ are just the b-ary digits of y, and in the case where $s = k$ and $b_i = m_{i+1}$ with $q = 0$, this is the Mixed-Radix (MR) representation with respect to the moduli $m_1, \ldots, m_k$.

To find the MR representation of a number $y = d_0 + d_1 b_0 + \ldots + d_{s-1} b_0 \ldots b_{s-2}$, given in RNS representation (note that q is assumed to be 0), or an approximation thereto, we propose the following algorithm, with parts 1, and 2, the latter having subparts 2a and 2b:

1. Set $\hat{y}^{(0)} = y$;
2. for $t = 0, \ldots, s-1$, do
   (a) $e_t = \langle \hat{y}^{(t)} \rangle_{b_t}$;
   (b) $\hat{y}^{(t+1)} = (\hat{y}^{(t)} - e_t + b_0 \ldots b_{s-1} f_t)/b_t$.

Here $f_0, \ldots, f_{s-1}$ are (possibly data dependent) obfuscating constants, subject to certain conditions to be discussed below; they could be changed for each new run of the algorithm. We may refer to the $b_0 \ldots b_{s-1} f_t$ as obfuscating number $F_t$. If all obfuscating numbers are equal, we may also refer to F, without the subscript indicating the iteration. The obfuscating number $F_t$ or the numbers $f_t$ may be precomputed and stored in constant storage 230.

In part 1 an intermediate number $\hat{y}$ is set equal to the input number y. In iterated parts 2a and 2b, a digit of the MR representation is determined (part 2a), and the intermediate number $\hat{y}$ is updated (part 2b). Note that for clarity the subsequent values of the intermediate number $\hat{y}$ are given indices t to distinguish them. However, in an embodiment the intermediate number may be overwritten with a new value when it is available.

Note also that the MR digit computed in part 2a is a pseudo-residue, but if the expansion factor is 1, this is the same as an exact residue. If the expansion factor is larger than 1, then some pseudo-residue may not be exact residues. In this case a digit of the conventional Mixed Radix representation is obtained. However, if the expansion factor is more than 1, the digit computed in part 2a could be different from the exact residue. In this case, we obtain the generalized mixed radix representation. Note that the expansion factor is under control of the implementer, e.g., by selecting the modular arithmetic that is used. A higher expansion factor allows the designer more freedom and is often preferred, but an expansion factor of 1 is also possible. In an embodiment, the pseudo-residue used in step 2a may not be an exact residue, for example, in an embodiment, at least one of the digits $e_t$ is larger or equal than the base $b_t$ of the radix representation. In case more general pseudo residues are used, it can also happen that at least one of the digits $e_t$ is less than 0. Some of the integer factors $f_t$ may be zero, but at least some of them are positive.

In part 2b the obfuscating number $b_0 \ldots b_{s-1} f_t$ may be replaced by $b_t \ldots b_{s-1} f_t$. This has the advantage that a larger range of choices for $f_t$ is available to choose from. For example, in an embodiment the obfuscating number is a multiple of the product of the bases $(b_0, b_1, \ldots, b_{s-1})$ used in the next iterations, e.g., $F_t = b_{t+1} \ldots b_{s-1} f_t$. If the obfuscating number is not a multiple of $b_t$, then the obfuscating number may be added after the division, this is less preferred.

In the above algorithm, a pseudo-RNS representation for the intermediate number $\hat{y}^{(t)}$ modulo $m = m_1 \ldots m_k$ is maintained. The digit $e_t$ may be computed using base extension as is further explained below. The pseudo-residues satisfy the integer expansion bound $\varphi$. That is, we have that $e_t = |\hat{y}^{(t)}|_{b_t} + \delta_t b_t$ with $0 \leq \delta_t < \varphi$ for all t, with $\delta_t$ some nonnegative integer variable bounded by the expansion factor $\varphi$. The integer $\delta_t$ is typically unknown at compile time.

Define $$\theta = \max_t \left\lceil \frac{b_t(\varphi - 1)}{b_t - 1} \right\rceil.$$

The algorithm has the following properties: for $0 \leq t \leq s$, there are integers $\varepsilon_t$ with $\varepsilon_{-1} = 0$ by definition and $0 \leq \varepsilon_t \leq \theta$ so that $$\hat{y}^{(t)} = d_t + d_{t+1}b_t + \ldots + d_{s-1}b_t \ldots b_{s-2} + f_0 b_t \ldots b_{s-1} + f_1 b_t \ldots b_{s-1} b_0 + \ldots + f_{t-1} b_t \ldots b_{s-1} b_0 \ldots b_{t-2} - \varepsilon_{t-1}; \quad 1.$$

$$e_t = d_t - \varepsilon_{t-1} + \varepsilon_t b_t. \quad 2.$$

The statements 1 and 2 may be proven by mathematical induction.

In other words, the integers $\varepsilon_t$ indicate the distance between the exact residue $d_t$ and the pseudo residue $e_t$. As a consequence, we have that $$\hat{y}^{(s)} = f_0 + f_1 b_0 + \ldots + f_{s-1} b_0 \ldots b_{s-2} - \varepsilon_{s-1} = f - \varepsilon_{s-1}; \quad 1.$$

$$y = e_0 + e_1 b_0 + \ldots + e_{s-1} b_0 \ldots b_{s-2} - \varepsilon_{s-1} b_0 \ldots b_{s-1} = e - \varepsilon_{s-1} b_0 \ldots b_{s-1}. \quad 2.$$

Note that expression 2 is a generalized mixed radix representation for y. Surprisingly, of the 'error'-integers $\varepsilon_t$, only the final one, $\varepsilon_{s-1}$ occurs in this expression. All others cancel.

There are several ways in which $\varepsilon_{s-1}$ may be computed if desired. In an embodiment, the value f is computed, e.g., as a further part of the iteration, using formula 1. For example, one could compute f iteratively by starting f at f=0, and adding the terms of formula 1, as soon as each new term $f_t$ is available. One can then determine $\varepsilon_{s-1}$ from the computed RNS representation of $\hat{y}^{(s)}$ and the known (RNS representation of) f Alternatively, one could obtain $\varepsilon_{s-1}$ from a fixed exact residue off modulo a small modulus $m_0 \geq \theta + 1$, e.g., a redundant modulus, combined with the RNS representation of $\hat{y}^{(s)}$.

Once we know $\varepsilon_{s-1}$, we have a GMR representation for y with digits $e_t$ satisfying $0 \leq e_t < \varphi b_t$ for all t and $0 \leq \varepsilon_{s-1} \leq \theta$. As explained above, the GRM is often good enough to be employed in a digit-based algorithm. We refer to $\varepsilon_{s-1}$ as a correction term. For example, the correction term $\varepsilon_{s-1}$ may also be exported as output, e.g., stored in digit storage 240. Note that the $e_t$ can be larger than the corresponding base, which is compensated for by subtracting the term $\varepsilon_{s-1} b_0 \ldots b_{s-1}$.

In case that the pseudo-residues $e_t$ are in fact known to be exact residues (that is, if $\varepsilon_t = 0$ is known for all t), the algorithm delivers $e_t = d_t$, so in fact the exact MR digits are determined. If in addition $f_t = 0$ for all t, then the algorithm reduces to the reference algorithm described above to determine MR digits. In an embodiment, the integers $f_t$ are chosen to be small enough to still allow an RNS representation of the intermediate values $y^{(t)}$. The latter may be accomplished if the range of possible intermediate values $y^{(t)}$ has size at most m.

In an embodiment, the modular arithmetic is done using lookup tables. In the case where some or all of the $b_t$ are too big to allow the implementation of the modular arithmetic by lookup tables, the required modular arithmetic may be implemented, for example, using Montgomery multiplication or similar methods. See, e.g., Jean-François Dehm. *Design of an efficient public-key cryptographic library for RISC-based smart cards*. PhD thesis, Université Catholique de Louvain, 1998, for a discussion of a number of modular arithmetic algorithms, in particular, modular multiplication, more in particular Montgomery multiplication. Interestingly, modular arithmetic methods typically deliver the result as a pseudo-residue. Extra efforts are required to obtain the exact residue. In general, an exact residue cannot even be determined without leaving the RNS representation domain. However, in such a situation, the method described herein enables a form of digit-determination entirely within the RNS realm, employing pseudo-residues instead of exact residues.

For example, the Montgomery algorithm in Dehm (section 2.2.6) has as the final two steps that "if $U_n > N$ then $U = U_n - N$ else $U = U_n$," omitting this extra reduction step would give a modular reduction algorithm in which the output is a pseudo residue with expansion factor 2. Modular multiplication algorithms with a larger expansion factor, even as high as a few hundred may be used in the algorithm.

Below an RNS implementation suitable for the conversion is further detailed. Suppose that y is given by its (redundant) RNS representation $(y_0, y_1, \ldots y_k)$ with respect to the RNS moduli $m_1, \ldots, m_k$ and redundant modulus $m_0$; write $m = m_1 \ldots m_k$ to denote the dynamical range of the RNS. The moduli $m_0, m_1, \ldots, m_k$ are relatively prime positive integers. Moreover, arithmetic modulo $m_0$ is exact, so that residues modulo $m_0$ are not pseudo-residues but true residues. For example, the arithmetic modulo $m_0$ could be implemented by table lookup. Arithmetic modulo the other moduli could also be done through table look up, but may also use an implementation of a modular algorithm, e.g., Montgomery multiplication, etc.

The residues modulo $m_0$ is referred to as a redundant modulus. Alternatively, the redundant modulus could be the product of multiple moduli; in this case computation is done with exact residues for the multiple moduli. Moreover, in an embodiment we will make the usual condition that $m_0 \geq k$ to enable base extension, or, when working with pseudo-residues with expansion factor $\varphi$, we require that $m_0 \geq k\varphi$. In the implementation of the algorithm, we will maintain an RNS representation $(\hat{y}_{t,0}, \hat{y}_{t,1}, \ldots, \hat{y}_{t,k})$ for $\hat{y}^{(t)}$, where $\hat{y}_{t,i} = \langle y^{(t)} \rangle_{m_i}$ is a pseudo-residue of $\hat{y}^{(t)}$ modulo $m_i$, for all $i \geq 1$, and an exact residue of $\hat{y}^{(t)}$ modulo $m_0$ for i=0.

In what follows, we describe the RNS implementation of the algorithm for the case where $b_0 = \ldots = b_{s-1} = b = m_k$; it is easily understood how to proceed in a more general case. The iteration step of the algorithm may now be implemented as follows. For t=1, . . . , k, we have $e_t = \langle \hat{y}^{(t)} \rangle_b$; since we assumed $m_k = b$, we can take $e_t = \hat{y}_{t,k}$. Then, for $i \neq k$, we can immediately compute $$\hat{y}_{t+1,i} = \langle (\hat{y}_{t,i} - e_t + f_t b^s) \overline{b}_i \rangle_{m_i},$$

where $\overline{b}_i = |b^{-1}|_{m_i}$ is the multiplicative inverse modulo $m_i$. The constant $\overline{b}_i$ exists since in an RNS the distinct moduli are relatively prime; this constant may be precomputed. However, for $\hat{y}_{t+1,k}$, we have to proceed differently since $m_k = b$ does not have a multiplicative inverse modulo $m_k$. This is solved by using base extension to determine $\hat{y}_{t+1,k}$. In an embodiment, we use the following redundant modulus method. For example, for $1 \leq t < k$, we compute $$\eta_i = \langle \hat{y}_{t+1,i} | (m/(m_i m_k))^{-1} | \rangle_{m_i} \rangle_{m_i};$$

then we have that $$\hat{y}^{(t+1)} = \sum_{1 \le i < k} \eta_i(m/(m_i m_k)) - qm/m_k,$$

provided that $\hat{y}^{(t+1)} < m/m_k$, the dynamical range of the "reduced" RNS based on the $m_i$ with $i \ne 0, k$. Now the (exact) value of q is computed from the redundant residue $\hat{y}_{t+1,0}$ modulo $m_0$ as $$q = |\hat{y}_{t+1,0} \cdot |-(m/m_k)^{-1}|_{m_0} + \sum_{1 \le i < k} \eta_i |1/m_i|_{m_0}|_{m_0}.$$

Once q is determined, we can compute $\hat{y}_{t+1,k}$ as $$\hat{y}_{t+1,k} = \langle \sum_{1 \le i < k} \eta_i |(m/(m_i m_k))|_{m_k} + q|(-m/m_k)|_{m_k} \rangle_{m_k}.$$

The constants in these expressions can be precomputed and can be assumed to be exact residues.

The modular operations required to compute the above expression for $\hat{y}_{t+1,k}$ could be implemented by ordinary operations, followed by a final reduction modulo $m_k$, e.g. using postponed reduction. Since we work with pseudo-residues here, we only have that $\eta_i < \varphi m_i$ (where $\varphi$ is the expansion factor). Since $0 < \hat{y}^{(t)} < m/m_k$ is assumed, we have that $0 \le q < (k-1)\varphi$; so in order to be able to determine the value of q as above, we must require that $m_0 \ge (k-1)\varphi$.

The above algorithm is suitable to be implemented in a white-box encoded system, e.g., using either an RNS with exact residues, with the modular arithmetic implemented by table lookup, or an RNS using pseudo residues, etc.

The obfuscating numbers $f_t$ can be chosen in various ways. If the algorithm is used in the context of an RNS with moduli $m_1, \ldots, m_k$ with dynamical range $m = m_1 \ldots m_k$, then the integers $f_0, \ldots, f_{s-1}$ must be small enough to ensure that $\hat{y}^{(t)} < m$ to prevent overflow. For example, provided that $b^s \le m$, it is sufficient if we require $0 \le f_t < b_t$. Apart from that, we can choose the $f_t$ in an arbitrary way, provided that at the end we can compute the desired representation of f needed to compute $\varepsilon_{s-1}$. Note that by choosing an $f_t$ smaller than indicated, e.g., $f_t = 0$, a later $f_{t'}$ (t'>t) may be chosen larger than indicated. A particular advantageous choice, is to take $f_t = e_t$.

In an embodiment, the $f_t$ are fixed constants,

In an embodiment, the $f_t$ may vary with every new application of the algorithm. For example, conversion may be used multiple times in an application, e.g., some larger computation, each such conversion may have different, but fixed, obfuscation numbers. This is especially attractive in a white-box application.

In an embodiment, the obfuscating numbers $f_t$ depend only on the input number y. This has the advantage that different runs with different inputs use different obfuscating numbers, thus making it harder to correlate two different runs with each other. But in runs with the same input, the entire computation is the same, as it depends only on the input number. Thus, performing multiple runs with the same input cannot give additional information to attack the system. For example, the obfuscating numbers $f_t$ may be a, possibly varying, function of the input, possibly indirectly by depending on, other data in the program. For example, we could take $f_t = e_t$ for all t, or even $f_t = |e_t + c_t|_{b_t}$ for constants $c_t$ that could, e.g., vary with every application of the algorithm. These choices add to the leak-resistance of the method.

In an embodiment, the conversion is part of a larger application. The larger application may calculate on multiple numbers in RNS representation thus producing a resulting number in RNS representation. The resulting number needs converting to a radix representation as the input number. The data on which the larger application operates can be used as a random source for the obfuscation number. For example, the multiple $f_t$ may depend on one or more of the multiple numbers in RNS representation.

As mentioned above, the moduli should be chosen in such a way that $\hat{y}^{(t)} < m$, the dynamical range, for all t. If we use the algorithm for example with digit base $m_1, \ldots, m_k$ and with $f_t = e_t$ where the $e_t$ are pseudo-residues (so with possibly $e_t \ge m_t$), then to ensure that indeed $\hat{y}^{(t)} < m$, we can add a few moduli $m_{k+1}, \ldots, m_{k+r}$ to the RNS. Equivalently, we can restrict the number y by assuming that $y < m_1 \ldots m_1$, and then replace part 2(b) of the algorithm with $$\hat{y}^{(t+1)} = (\hat{y}^{(t)} - e_t + m_1 \ldots m_s f_t)/b_t.$$

In other words, we apply the algorithm with digit base $b_0 = m_1, \ldots, b_{r-1} = m_r$ (so with s=r) in order to prevent overflow during the run of the algorithm.

If we use the algorithm with $b_t = b$, fixed, and with $f_t < b$ for all t, then $\hat{y}^{(t)} < b^s$ for all t. Typically, we have that b is equal to one of the moduli, say $m_k = b$. In that case, we have to determine $d_t = \hat{y}_{t,k}$ by base extension with respect to the RNS formed by the moduli $m_1, \ldots, m_{k-1}$. In that case, the condition on the dynamical range is that $b^s \le m/m_k$. In the case where b is relatively prime to all the $m_i$, we must determine $d_t = \langle \hat{y}^{(t)} \rangle_b$ by base extension using the full RNS; in that case, the requirement is that $b^s \le m$.

In part 2b of the algorithm, given above as $\hat{y}^{(t+1)} = (\hat{y}^{(t)} - e_t + b_0 \ldots b_{s-1} f_t)/b_t$, the obfuscating part may be generalized. Instead of adding $b_0 \ldots b_{s-1} f_t$, it is also possible to add $b_t \ldots b_{s-1} f_t$. This gives more choices for $f_t$. Instead of adding $b_t \ldots b_{s-1} f_t$ before the division one could also add $b_{t+1} \ldots b_{s-1} f_t$ after the division.

In an embodiment, the algorithm is run with digit base $b_t = b$ for all $t = 0, \ldots, s-1$, with $f_t = |e_t + c_t|_b$ for constants $c_t$, in combination with an RNS with moduli $m_1, \ldots, m_k$ with $m_k = b$, applying "redundant modulus" base extension as above when required.

Below the modifications are indicated to adapt for an embodiment in which not all moduli $m_1, \ldots, m_k$ are relatively prime. Consider $= (x_1, \ldots, x_k) \mod (m_1, \ldots, m_k)$. We have that $x_i = x_j \mod \gcd(m_i, m_j)$ for all pairs i and j. Using this, the Generalized Chinese Remainder Theorem (GCRT) states that there is a unique x mod m, with $m = \text{lcm}(m_1, \ldots, m_k)$. This number can be recovered as follows. Determine constants $c_1, \ldots, c_k$ such that $$c_1(m/m_1) + \ldots + c_k(m/m_k) = 1 \mod m.$$

Such constants always exist, in fact one may even require that $0 <= c_i < m_i$. The constants $c_i$ take over the role of the constants $|(m/m_i)^{\{-1\}}|_{m_i}$ in the regular CRT. This means that $x_1 c_1(m/m_1) + \ldots + x_k c_k(m/m_k) = x \mod m$.

Using this representation, we can do everything that we could do with the regular RNS, including base extension using a redundant modulus. In fact from the latter equation we get that $e_i = |x_i c_i|_{m_i}$ or $e_i = \langle x_i c_i \rangle_{m_i}$ so that $$x = e_1 \left(\frac{m}{m_1}\right) + \ldots + e_k \left(\frac{m}{m_k}\right) - qm,$$

with $0 \le q < k$ as usual.

Typically, the calculating device 200 comprises a microprocessor (not separately shown in FIG. 2) which executes appropriate software stored at the device 200; for example, that software may have been downloaded and/or stored in a corresponding memory, e.g., a volatile memory such as RAM or a non-volatile memory such as Flash (not separately shown). Alternatively, the device 200 may, in whole or in part, be implemented in programmable logic, e.g., as field-programmable gate array (FPGA). Device 200 may be implemented, in whole or in part, as a so-called application-specific integrated circuit (ASIC), i.e. an integrated circuit (IC) customized for their particular use. For example, the circuits may be implemented in CMOS, e.g., using a hardware description language such as Verilog, VHDL etc.

In an embodiment, calculating device 200 comprises a digit forming circuit, an updating circuit, an obfuscating circuit, a constant storage, a variable storage and a digit store. The circuits implement the corresponding units described herein. The circuits may be a processor circuit and storage circuit, the processor circuit executing instructions represented electronically in the storage circuits. The circuits may also be, FPGA, ASIC or the like.

Below a detailed example of an embodiment during operation is given. We now give an example of our method for an RNS with $k=3$ and moduli $m_1=13$, $m_2=11$, $m_3=7$ and redundant modulus $m_0=4$, with digit base $b_0=b_1=7$, so with $s=2$, and with taking $f_t=e_t$, and with pseudo-residues with $\varepsilon_t < \varphi = 2$ for all t (so using pseudo-residues with expansion factor $\varphi=2$). Note that for every t, the number $\hat{y}^{(t)}$ will have the form $a+7b$ with a, $b<2\cdot 7=14$, so that $\hat{y}^{(t)} \leq 13 + 13\cdot 7 = 8\cdot 13 < m_1 \cdot m_2$, so that base extension using the reduced RNS with moduli $m_1$, $m_2$ to determine the residue modulo $m_3=7$ is feasible. Moreover, we have that $m_0 \geq (k-1)\varphi = 2\cdot 2 = 4$ as required.

Let us take $y=2+5\cdot 7=37$ (assumed to be unknown), represented by the (known) residues (1; 11,4,2) modulo (4; 13,11,7). Running our algorithm, we obtain the following.

1. $\hat{y}^{(0)} = y \sim (1;11,4,2)$;

2. $e_0 = \langle \hat{y}^{(0)} \rangle_7 = \hat{y}_{0,3} + 1 \cdot 7 = 9$ (pseudo-residue), so $\varepsilon_0 = 1$; the RNS of $e_0$ equals (1;9,9,2).

$\hat{y}^{(1)} = (\hat{y}^{(0)} + 9\cdot(7^2-1))/7 = 67 \equiv (3;2,1,4)$; since $7^{-1} \sim (3; 2,8,-)$, we indeed find that (a) $(\hat{y}_{1,0}; \hat{y}_{1,1}, \hat{y}_{1,2}, \hat{y}_{1,3}) \equiv ((1; 11,4,2)-(1; 9,9,2))*(3; 2,8, -)+(9\cdot 7; 9\cdot 7, 9\cdot 7, 9\cdot 7) \equiv (3;2,1, -)$, so we might obtain $\hat{y}_{1,0}=3$ and the pseudo-residues $\hat{y}_{1,1}=2+1\cdot 13=15$ and $\hat{y}_{1,2}=1+0\cdot 11=1$;

(b) $\eta_1 = \langle 15 \cdot |11^{-1}|_{13} \rangle_{13} \equiv \langle 2\cdot 6 \rangle_{13} \equiv 12 \mod 13$; so, for example, $\eta_1=25$;

(c) $\eta_2 = \langle 1 \cdot |13^{-1}|_{11} \rangle_{11} \equiv 1\cdot 6 \equiv 6 \mod 11$; so, for example $\eta_2=17$;

(d) so $\hat{y}^{(1)} = 25\cdot 11 + 17\cdot 13 - q\cdot 13\cdot 11$;

(e) From the redundant residue, we get $3 \equiv 1\cdot 3 + 1\cdot 1 - q\cdot 1\cdot 3 \equiv -3q \mod 4$, hence $q=3$;

(f) Hence $\hat{y}_{1,3} = \langle 25 \cdot |11|_7 + 17\cdot |13|_7 + 3|(-13\cdot 11)|_7 \rangle_7 \equiv 4 \mod 7$, so for example $\hat{y}_{1,3}=11$.

(g) So now we have $\hat{y}^{(1)} \sim (3; 15,1,11)$;

3. $e_1 = \hat{y}_{1,3} = 11$ (pseudo-residue), so $\varepsilon_1=1$; we see that $y=e-1\cdot 7^2$ with $e=9+11\cdot 7=86$;

$\hat{y}^{(2)} = (\hat{y}^{(1)} + e_1((7^2-1))/7 = (67-11)/7 + 11\cdot 7 = 85 \equiv (1; 7,8,1)$; indeed, we find that (a) $(\hat{y}_{2,0}; \hat{y}_{2,1}, \hat{y}_{2,2}, \hat{y}_{2,3}) \equiv ((3; 15,1,11)-(3; 11,0,4))*(3; 2,8, -)+(11\cdot 7; 11\cdot 7, 11\cdot 7, 11\cdot 7) \equiv (1; 7,8, -)$, so, we might obtain $\hat{y}_{2,0}=1$ and the pseudo-residues $\hat{y}_{2,1}=7+0\cdot 13=7$ and) $\hat{y}_{2,2}=8+0\cdot 11=8$;

(b) $\eta_1 = \langle 7 \cdot |11^{-1}|_{13} \rangle_{13} \equiv \langle 7\cdot 6 \rangle_{13} \equiv 3 \mod 13$; so, for example $\eta_1=3$;

(c) $\eta_2 = \langle 8 \cdot |13^{-1}|_{11} \rangle_{11} \equiv 8\cdot 6 \equiv 4 \mod 11$; so, for example $\eta_2=4$;

(d) so $\hat{y}^{(2)} = 3\cdot 11 + 4\cdot 13 - q\cdot 13\cdot 11$;

(e) From the redundant residue, we get $1 \equiv 3\cdot 3 + 4\cdot 1 - q\cdot 1\cdot 3 \equiv 1-3q \mod 4$, hence $q=0$;

(f) Hence $\hat{y}_{1,3} = \langle 3 \cdot |11|_7 + 4\cdot |13|_7 + 0|(-13\cdot 11)|_7 \rangle_7 \equiv 1 \mod 7$, so for example) $\hat{y}_{1,3}=8$.

(g) So now we have $\hat{y}^{(2)} \sim (1; 7,8,8)$;

We have $f=e=86 \sim (2; -, -, -)$ while $\hat{y}^{(2)} = e - \varepsilon_1 \sim (1; -, -, -)$; so, from the redundant modulus, we conclude that $\varepsilon_1=1$.

Since $y=e-\varepsilon_1 7^2$, we find the (approximate) GMR representation $$y = 9 + 11\cdot 7 - 1\cdot 7^2.$$

Note also that $d_0=2$ and $d_1=5$, so that $9=e_0=d_0+1\cdot 7$, so $\varepsilon_0=1$, and $11=e_1=5-1+1\cdot 7$, so that indeed $\varepsilon_1=1$.

Figure 3:
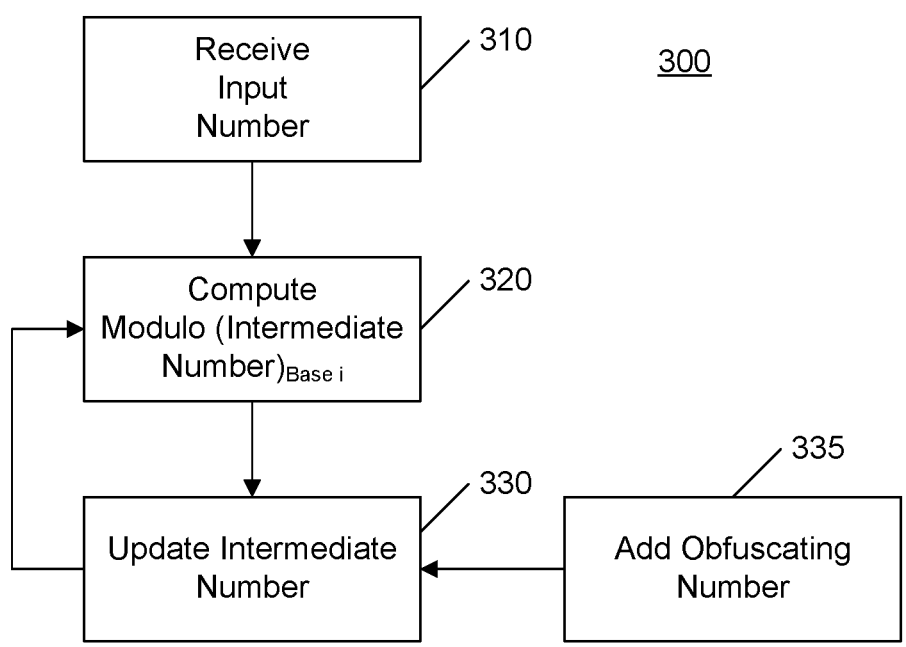

FIG. 3 schematically shows an example of an embodiment of a calculating method 300. Method 300 converts an input number y represented $(y_1, y_2, \ldots, y_k)$ in a residue number system to an output number represented in a radix representation $(e_0, e_1, \ldots, e_{s-1})$. Method 300 comprises receiving 310 the input number y represented in the residue number system, and computing 320 an intermediate number modulo a base $b_t$ of the radix representation to obtain a digit $e_t = \langle \hat{y} \rangle_{b_t}$ of the radix representation, the intermediate number ($\hat{y}$) is represented in the residue number system, updating 330 the intermediate number $\hat{y} \leftarrow (\hat{y} - e_t + F)/b_t$ by subtracting the digit from the intermediate number. The updating 330 includes adding 335 an obfuscating number f; and dividing by the base $b_t$.

The parts 320 and 330 are iterated so that the iterations produce the digits $(e_0, e_1, \ldots, e_{s-1})$ in the radix representation with respect to the bases $(b_0, b_1, \ldots, b_{s-1})$ of the radix representation.

Many different ways of executing the method are possible, as will be apparent to a person skilled in the art. For example, the order of the steps can be varied or some steps may be executed in parallel. Moreover, in between steps other method steps may be inserted. The inserted steps may represent refinements of the method such as described herein, or may be unrelated to the method. For example, some parts may be executed, at least partially, in parallel. Moreover, a given step may not have finished completely before a next step is started.

A method according to the invention may be executed using software, which comprises instructions for causing a processor system to perform method 300. Software may only include those steps taken by a particular sub-entity of the system. The software may be stored in a suitable storage medium, such as a hard disk, a floppy, a memory, an optical disc, etc. The software may be sent as a signal along a wire, or wireless, or using a data network, e.g., the Internet. The software may be made available for download and/or for remote usage on a server. A method according to the invention may be executed using a bitstream arranged to configure programmable logic, e.g., a field-programmable gate array (FPGA), to perform the method.

It will be appreciated that the invention also extends to computer programs, particularly computer programs on or in a carrier, adapted for putting the invention into practice. The program may be in the form of source code, object code, a code intermediate source, and object code such as partially compiled form, or in any other form suitable for use in the implementation of the method according to the invention. An embodiment relating to a computer program product comprises computer executable instructions corresponding to each of the processing steps of at least one of the methods set forth. These instructions may be subdivided into sub-routines and/or be stored in one or more files that may be linked statically or dynamically. Another embodiment relating to a computer program product comprises computer executable instructions corresponding to each of the means of at least one of the systems and/or products set forth.

Figure 4A:
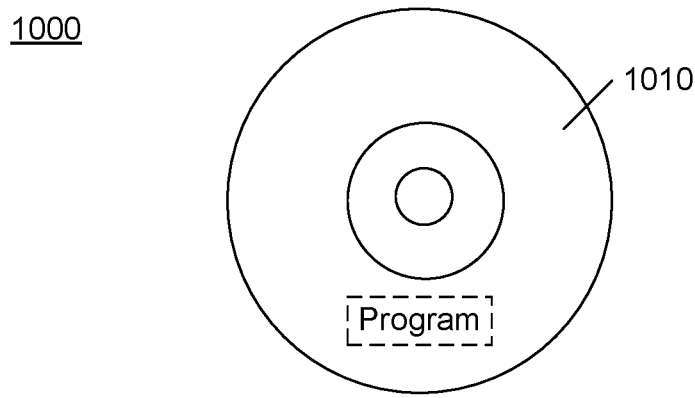

FIG. 4a shows a computer readable medium 1000 having a writable part 1010 comprising a computer program 1020, the computer program 1020 comprising instructions for causing a processor system to perform a calculating method, according to an embodiment. The computer program 1020 may be embodied on the computer readable medium 1000 as physical marks or by means of magnetization of the computer readable medium 1000. However, any other suitable embodiment is conceivable as well. Furthermore, it will be appreciated that, although the computer readable medium 1000 is shown here as an optical disc, the computer readable medium 1000 may be any suitable computer readable medium, such as a hard disk, solid state memory, flash memory, etc., and may be non-recordable or recordable. The computer program 1020 comprises instructions for causing a processor system to perform said calculating method.

Figure 4B:
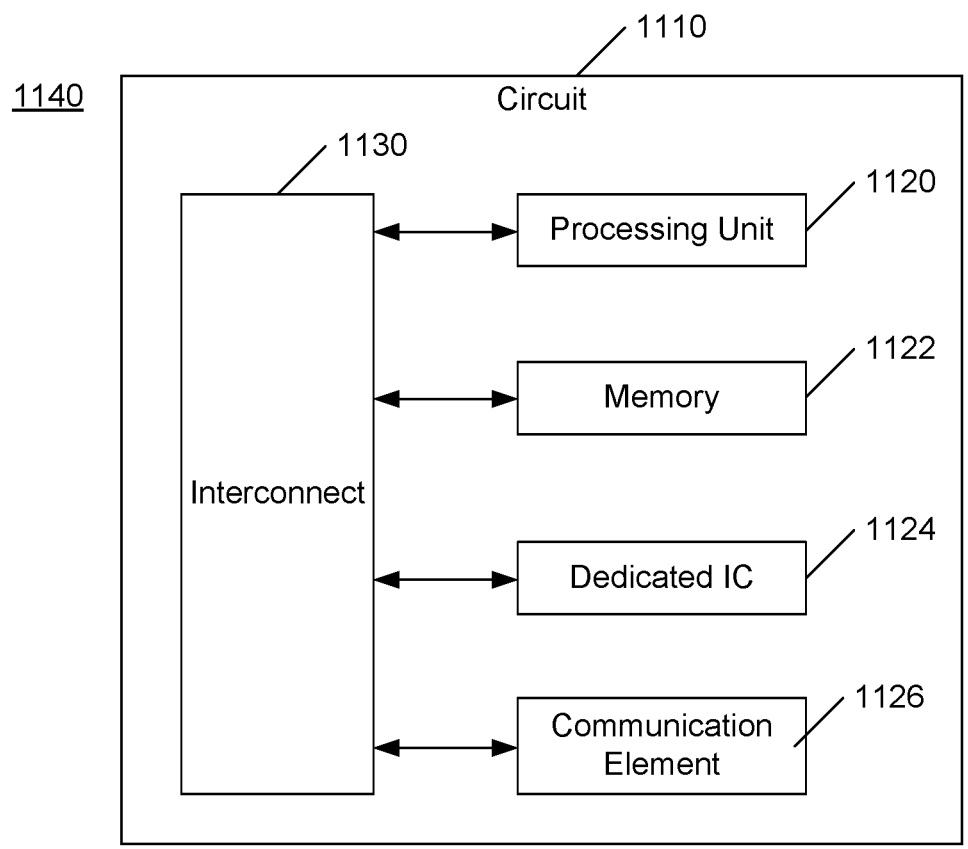

FIG. 4b shows in a schematic representation of a processor system 1140 according to an embodiment. The processor system comprises one or more integrated circuits 1110. The architecture of the one or more integrated circuits 1110 is schematically shown in FIG. 4b. Circuit 1110 comprises a processing unit 1120, e.g., a CPU, for running computer program components to execute a method according to an embodiment and/or implement its modules or units. Circuit 1110 comprises a memory 1122 for storing programming code, data, etc. Part of memory 1122 may be read-only. Circuit 1110 may comprise a communication element 1126, e.g., an antenna, connectors or both, and the like. Circuit 1110 may comprise a dedicated integrated circuit 1124 for performing part or all of the processing defined in the method. Processor 1120, memory 1122, dedicated IC 1124 and communication element 1126 may be connected to each other via an interconnect 1130, say a bus. The processor system 1110 may be arranged for contact and/or contact-less communication, using an antenna and/or connectors, respectively.

For example, in an embodiment, the calculating device may comprise a processor circuit and a memory circuit, the processor being arranged to execute software stored in the memory circuit. For example, the processor circuit may be an Intel Core i7 processor, ARM Cortex-R8, etc. The memory circuit may be an ROM circuit, or a non-volatile memory, e.g., a flash memory. The memory circuit may be a volatile memory, e.g., an SRAM memory. In the latter case, the calculating device may comprise a non-volatile software interface, e.g., a hard drive, a network interface, etc., arranged for providing the software.

It should be noted that the above-mentioned embodiments illustrate rather than limit the invention, and that those skilled in the art will be able to design many alternative embodiments.

In the claims, any reference signs placed between parentheses shall not be construed as limiting the claim. Use of the verb "comprise" and its conjugations does not exclude the presence of elements or steps other than those stated in a claim. The article "a" or "an" preceding an element does not exclude the presence of a plurality of such elements. The invention may be implemented by means of hardware comprising several distinct elements, and by means of a suitably programmed computer. In the device claim enumerating several means, several of these means may be embodied by one and the same item of hardware. The mere fact that certain measures are recited in mutually different dependent claims does not indicate that a combination of these measures cannot be used to advantage.

In the claims references in parentheses refer to reference signs in drawings of exemplifying embodiments or to formulas of embodiments, thus increasing the intelligibility of the claim. These references shall not be construed as limiting the claim.

LIST OF REFERENCE NUMERALS IN FIGS. 1 AND 2

100 a calculating device
110 an input interface
120 a processor circuit
130 a memory
150 a computing device
200 a calculating device
210 a digit forming unit
220 an updating unit
225 an obfuscating unit
230 a constant storage
235 a variable storage
240 a digit store

The invention claimed is:

1. A cryptographic computer device that is configured to perform cryptologic functions in an environment (whitebox) wherein the operation of the cryptographic computer device during the execution of the cryptologic functions can be openly monitored and consequently at-risk for leakage of cryptologic information, the cryptographic computer device comprising:
a computer device circuit that executes a cryptographic function,
wherein the cryptographic function requires conversion of a first encoded number that is represented in a residue number system (RNS) into a second encoded number that is represented in a Radix representation;
a calculating device comprising:
an input interface circuit,
wherein the input interface circuit receives the first encoded number in the RNS representation as an encoded input number, and
a processor circuit,
wherein the processor circuit converts the encoded input number in the RNS representation into an encoded output number in the Radix representation,
wherein the processor circuit provides the encoded output number to the cryptographic function as the second encoded number;
wherein the Radix representation of the encoded output number comprises a set of bases,
wherein the encoded output number comprises digits in the Radix representation corresponding to the bases,
wherein the processor circuit iteratively updates an intermediate number represented in the residue number system,
wherein each iteration produces an iteration digit of the encoded output number, wherein at least one iteration comprises:
computing a modulo of the intermediate number relative to an iteration base of the set of bases corresponding to the at least one iteration to obtain the iteration digit of the encoded output number corresponding to the at least one iteration,
updating the intermediate number by subtracting the iteration digit from the intermediate number,
adding an obfuscating number to the intermediate number, and
dividing the intermediate number by the iteration base,
wherein the obfuscating number is a multiple of a product of one or more of the bases of the set of bases,
wherein the obfuscating number is greater than 0,
wherein the adding of the obfuscating number spreads the intermediate number over a substantially larger range of the intermediate numbers than a range of the intermediate numbers without the adding, thereby reducing the cryptologic leakage of information.

2. The calculating device of claim 1, wherein all the bases of the set of bases are equal.

3. The calculating device of claim 1,
wherein the iteration digit is larger-than or equal-to 0, and
wherein the iteration digit is less than a predetermined multiple of the iteration base.

4. The calculating device of claim 3, wherein the iteration digit is less than the iteration base.

5. The calculating device of claim 1, wherein at least one iteration digit is less than 0, or, larger-than or equal-to the iteration base.

6. The calculating device of claim 1,
wherein the processor circuit computes a correction term,
wherein the correction term indicates a difference between the encoded input number and a number represented by the digits of the output number.

7. The calculating device of claim 1,
wherein the processor circuit computes a correction term,
wherein the correction term is a difference between a final iteration digit and the modulo of the intermediate number relative to the iteration base,
wherein the modulo of the intermediate number is configured to produce a result that is at least 0, and less than the iteration base.

8. The calculating device of claim 1 wherein at least one of the bases of the set of bases is a modulus of the residue number system.

9. The calculating device of claim 1, further comprising a memory, wherein the encoded input number and the intermediate numbers are stored in the memory in an encoded form.

10. The calculating device of claim 1,
wherein the processor circuit processes multiple numbers in the RNS representation to produce a resulting number in the RNS representation,
wherein the resulting number is the encoded input number,
wherein the multiple in the obfuscation number depends on one or more of the multiple numbers in the RNS representation.

11. The calculating device of claim 1, wherein the processor circuit executes a digit-based Montgomery-multiplication with the encoded output number as a multiplicand of the Montgomery-multiplication.

12. The calculating device of claim 1, wherein a first intermediate number of the first iteration is the encoded input number.

13. The calculating device of claim 1, wherein the encoded output number is represented by the digits of the encoded output number and a correction term.

14. The calculating device as in claim 1,
wherein the RNS system is a redundant RNS system having at least one redundant modulus,
wherein the updating of the intermediate number for the redundant modulus provides a residue for the redundant modulus that is greater-than or equal-to 0 and less than the redundant modulus.

15. The calculating device of claim 1, wherein the digits of the encoded output number are stored in a memory of the calculating device in an encoded form.

16. The calculating device of claim 7, wherein the difference is divided by the iteration base.

17. A method of improving the security of a cryptologic computer device that is configured to perform cryptologic functions in an environment (white-box) wherein the operation of the cryptographic computer device during the execution of the cryptologic functions can be openly monitored and consequently at-risk for leakage of cryptologic information, the method comprising:
executing a cryptologic function that requires conversion of a first encoded number that is represented in a residue number system (RNS) into a second encoded number that is represented in a Radix representation,
receiving, at a calculating device of the cryptographic computer device, the first encoded number in the RNS representation as an encoded input number,
converting the encoded input number in the RNS representation into an encoded output number in the Radix representation, and
providing the encoded output number to the cryptographic function as the second encoded number;
wherein the Radix representation comprises a set of bases,
wherein the encoded output number comprises a set of digits corresponding to the set of bases;
wherein the conversion of the encoded input variable comprises:
iteratively updating an intermediate number represented in the RNS to produce the encoded output number in the Radix representation,
wherein at least one iteration comprises:
computing a modulo of the intermediate number relative to an iteration base of the set of bases corresponding to the at least one iteration to obtain a corresponding iteration digit of the set of digits,
subtracting the iteration digit from the intermediate number,
adding an obfuscating number to the intermediate number, and
dividing the intermediate number by the iteration base;
wherein the obfuscating number is a multiple of the product of one or more of the bases of the set of bases,
wherein the obfuscating number is greater than 0,
wherein the adding of the obfuscating number spreads the intermediate numbers over a substantially larger range of the intermediate numbers than a range of the intermediate numbers without the adding, thereby reducing the leakage of cryptologic information.

18. The method of claim 17, wherein all the bases of the set of bases are equal.

19. A non-transitory computer-readable medium comprising a program for improving the security of a cryptologic computer device that is configured to perform cryptologic functions in an environment (white-box) wherein the operation of the cryptographic computer device during the execution of the cryptologic functions can be openly monitored and consequently at-risk for leakage of cryptologic information, wherein the program causes the cryptographic computer device to:
- execute a cryptologic function that requires conversion of a first encoded number that is represented in a residue number system (RNS) into a second encoded number that is represented in a Radix representation,
- receive the first encoded number in the RNS representation as an encoded input number,
- convert the encoded input number in the RNS representation into an encoded output number in the Radix representation, and
- provide the encoded output number to the cryptographic function as the second encoded number;
- wherein the Radix representation comprises a set of bases,
- wherein the output variable comprises a set of digits corresponding to the set of bases;
- wherein the program causes the processor to process the encoded input variable by iteratively updating an intermediate number represented in the RNS to produce the encoded output number in the Radix representation,
- wherein at least one iteration comprises:
  - computing a modulo of the intermediate number relative to an iteration base of the set of bases corresponding to the at least one iteration to obtain a corresponding iteration digit of the set of digits,
  - subtracting the iteration digit from the intermediate number,
  - adding an obfuscating number to the intermediate number, and
  - dividing the intermediate number by the iteration base;
- wherein the obfuscating number is a multiple of the product of one or more of the bases of the set of bases,
- wherein the obfuscating number is greater than 0,
- wherein the adding of the obfuscating number spreads the intermediate numbers over a substantially larger range of the intermediate numbers than a range of the intermediate numbers without the adding, thereby reducing the leakage of cryptologic information.

20. The computer-medium of claim 19, wherein all the bases of the set of bases are equal.

* * * * *